United States Patent
Ryan et al.

[11] Patent Number: 5,988,199
[45] Date of Patent: Nov. 23, 1999

[54] CORPORATION STOP ASSEMBLY

[75] Inventors: Timothy B. Ryan, Sparks, Nev.; Harvey E. Svetlik, Dallas, Tex.

[73] Assignee: Phillips Petroleum Company, Bartlesville, Okla.

[21] Appl. No.: 08/742,707

[22] Filed: Nov. 1, 1996

[51] Int. Cl.⁶ .............................. F16K 43/00; F16L 41/04
[52] U.S. Cl. ....................... 137/15; 137/318; 251/315.14; 285/197
[58] Field of Search ............................ 137/15, 315, 318; 285/197; 251/315.14

[56] References Cited

U.S. PATENT DOCUMENTS

| | | | |
|---|---|---|---|
| 3,410,522 | 11/1968 | Daghe et al. | 137/318 |
| 3,412,742 | 11/1968 | Smith | 137/318 |
| 3,635,439 | 1/1972 | McNally | 251/315.14 |
| 3,723,229 | 3/1973 | Hutton | 156/580 |
| 3,799,182 | 3/1974 | Long | 137/318 |
| 3,841,667 | 10/1974 | Sands | 285/39 |
| 3,905,718 | 9/1975 | Luckenbill et al. | 137/318 |
| 3,937,245 | 2/1976 | Christie | 137/318 |
| 3,965,593 | 6/1976 | Christie | 137/318 |
| 3,995,655 | 12/1976 | Sands | 137/318 |
| 4,005,880 | 2/1977 | Anderson et al. | 285/47 |
| 4,411,407 | 10/1983 | Ninomiya et al. | 251/315.14 |
| 4,523,740 | 6/1985 | Paitchell | 251/315.14 |
| 5,076,318 | 12/1991 | Fedora | 137/318 |
| 5,150,923 | 9/1992 | Ohya et al. | 285/21 |
| 5,577,529 | 11/1996 | Katz | 137/318 |

*Primary Examiner*—George L. Walton
*Attorney, Agent, or Firm*—George E. Bogatie

[57] ABSTRACT

A fitting for coupling a service line to a polyethylene fluid distribution pipe such as a water main or a gas main includes a stub length of polyethylene pipe that serves as a base for attaching a corporation stop valve. The cross section of the open base end is machined to match the curvature of the outside surface of the main pipe and then fused into the sidewall of the main. The corporation stop valve can then be used for hot tapping polyethylene mains.

11 Claims, 5 Drawing Sheets

CORPORATION STOP ASSEMBLY

This invention relates to a pipe fitting assembly adapted for installation on the sidewall of a fluid conduit. More specifically it relates to a thermoplastic fusible base member attached to a valve that can be used as a corporation stop.

BACKGROUND

Municipal fluid distribution systems include water mains, gas mains and customer service lines connected to the mains for supplying individual customers. Most of the service lines are installed after the main line is in service. Therefore, a need exists to install service lines while the main conduit is carrying fluid under pressure.

Fittings for connecting service lines to mains usually incorporate a valve therein called a corporation stop valve, and the assembly of the valve and fitting is called a corporation stop assembly. They may, however, also be called service tees, elbows or straight transition fittings. In the past, where such fittings have been used with cast iron or steel pipe the inlet portion of the fitting was made with a tapered thread that cooperated with threads in a tapped hole in the main. With the increased popularity of plastic pipe made of polyethylene (PE), holes could be tapped but the threaded engagement of polyethylene parts often resulted in a leaking connection.

In view of this, service clamps, which incorporate two metal saddle parts for encircling the main pipe, are commonly used in making connections on main pipes of polyethylene. In these service clamps, one saddle part carries a branch pipe extension with a through bore that may be at least partially threaded for receiving a tapping tool to form a hole in the main pipe. The cutting member of the tapping tool is typically inserted through a valve attached to the bore of the branch pipe extension to allow removal of the tapping tool on pressurized systems without the escape of fluid from the main. Each saddle part carries a bolt or screw on opposite sides of the main pipe for uniformly clamping the assembly together. The main disadvantage of this service clamp is that it cannot be assembled quickly or easily about a main pipe, especially when using nuts with bolts for drawing the two saddle parts together is necessary. Accordingly, it requires considerable manipulation of the parts to insert bolts or screws into the tapped holes of the saddle parts while in the confines of a trench where the main pipe is found, and where adequate space for convenient assembly is lacking.

Self tapping saddle tee pipe fittings that are made of plastic material similar to the plastic used for the main pipe, have also come into widespread use. In this instance the fitting includes a saddle portion provided with an arcuate shaped surface complementary to the exterior surface of the main pipe. These fittings can be permanently attached to the main plastic pipe by solvent welding, heat-fusion, electrofusion, where abutting thermoplastic materials are brought to fusion temperature by electrically heating wires embedded in the thermoplastic material, or other bonding operation that permanently seals the saddle portion to the main pipe. The coupon cutter is provided with exterior threads that cooperate with the threads of the through bore for advancing the cutter. A self tapping saddle tee of the type described above is more fully described with reference to FIG. 2, and fusion techniques discussed at col. 1, lines 40–48, of U.S. Pat. No. 5,076,318, incorporated herein by reference.

While these self tapping saddle tees that can be sidewall fused to a polyethylene main pipe have found widespread use, several problems still exist, especially in making connections to thick wall, large diameter mains. For example the saddle tees, which have service outlets at 90° with respect to the through bore, are most conveniently installed on top of the main. This results in the service outlet having a 90° angle from the vertical. Installation contractors, however, prefer installing branch service lines having outlets extending from the lowest stress point on the main pipe, which is a 45° angle from the vertical. Another problem that limits use of the selftapping saddle tees is that in most instances the main pipe must be of relatively thin wall construction. Other problems arise in that self tapping tees are only available with ¾ inch and 1 inch outlet sizes for use on 3 to 12 inch (IPS/CTS) main pipes. A further problem is that while polyethylene service lines can be either butt fused or attached with a mechanical coupling to the outlet of the self tapping tee, a copper service must be attached with a mechanical coupling. Yet another problem arises in that such self tap-tees allow entrapment air to enter the customers' service line.

Accordingly, it is an object of this invention to provide a corporation stop assembly that promotes use of polyethylene pipe for municipal distribution systems.

Another object is to reduce labor costs for installing corporation stop valves.

A more specific object of the present invention is to simplify installation of branch pipes extending from the main pipe at a 45° angle from vertical.

Yet another object is to provide a corporation stop assembly for making a zero-leak-rate monolithic joint with a main pipe.

Another object is to provide a corporation stop assembly that advantageously replaces strap-on saddle and threaded corporation stop assemblies used on polyethylene pipe.

Yet another object of this invention is to provide a valve outlet fitting that is compatible with both polyethylene service lines and copper service lines.

Still another object is to hot tap a polyethylene pipe having a wall thickness of two inches.

SUMMARY OF THE INVENTION

According to the present invention the foregoing and other objects and advantages are attained by using a pipe fitting assembly incorporating a corporation stop valve for connecting a customer service branch pipe to a larger main fluid distribution pipe. The assembly includes a short polyethylene pipe base section constructed of high density polyethylene and having a circular cross section on one end machined to essentially match the curvature of the outer surface of the main pipe, and having a valve outlet on the other end for attaching a corporation stop valve made of metal or engineering type plastics to complete the assembly. The preferred corporation stop valve is a ball valve having a glass filled nylon body and a teflon filled polypropylene ball.

In one aspect of this invention, the corporation stop valve can be used for hot-tapping polyethylene mains. The machined end of the polyethylene base section is sidewall fused to the large diameter main pipe. Then a hole can be formed in the main pipe of a pressurized line by advancing the drill bit of an external hole drilling machine through the corporation stop valve and the bore of the polyethylene base section, to cut a hole in the main. The drill bit is then partially withdrawn to the upper part of the valve and the valve closed to allow removal of the bit and connection of the service line. The corporation stop valve is then opened to establish fluid flow to the customer.

The method and apparatus of this invention uses a novel corporation stop assembly to reduce time required and cost for branch pipe connections to polyethylene pipe mains, while providing a zero leak rate connection from any point on the main pipe. The assembly facilitates tapping through pipe walls having a thickness of two inches, and is adaptable for use on any main pipe diameter.

Other objects and advantages of the invention will be apparent from the appended claims and from the detailed description of the invention when read in conjunction with the accompanying drawings in which:

DETAILED DESCRIPTION OF THE INVENTION

Figure 1:
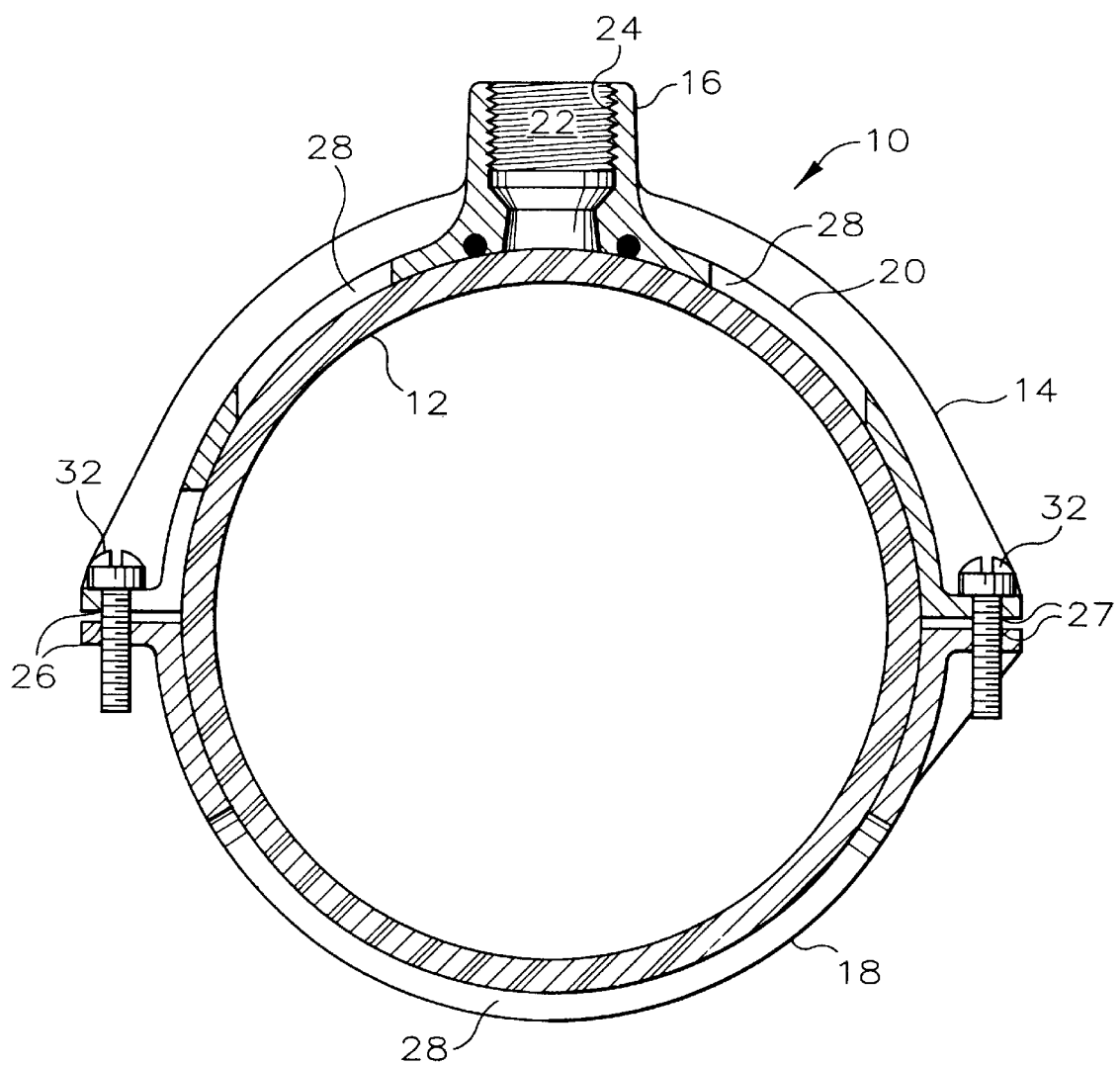
FIG. 1 is an elevation view in cross section of a conventional service clamp, illustrating the saddle parts tightly encompassing the main pipe with screws or bolts in position.

Referring now to FIG. 1, a prior art service clamp (or fitting) generally designated at 10 is used for tapping a hole in the main pipe 12, and also for supporting a branch pipe, not illustrated. The service clamp 10 comprises an upper saddle part 14 having a branch pipe extension 16, and a lower saddle part 18. The saddle parts are generally arcuate in shape having an interior curved surface 20 substantially matching the outer curved surface of the main pipe 12. The outwardly extending branch pipe extension 16 is illustrated as having a through bore 22 which may be at least partially threaded for receiving a tapping tool. The branch pipe may be welded to extension 16, or the extension 16 can be provided with exterior threads, not shown, for receiving interior threads of a branch pipe. As illustrated in FIG. 1, the saddle parts 14 and 18 are spaced apart relative to the main pipe 12 so that voids 28 are provided to reduce the amount of material used for the saddle parts. The ends of the saddle parts 14 and 18 are provided with oppositely disposed flanges which extend longitudinally in a direction along the axis of the main pipe 12 when the saddle parts are positioned on the main pipe 12. The flanges 26 and 27 are provided with apperatures or holes that my be slotted for receiving bolts or screws illustrated at 32. As previously noted, the main disadvantage of this service clamp is that it cannot be easily or economically assembled about a main pipe.

Figure 2:
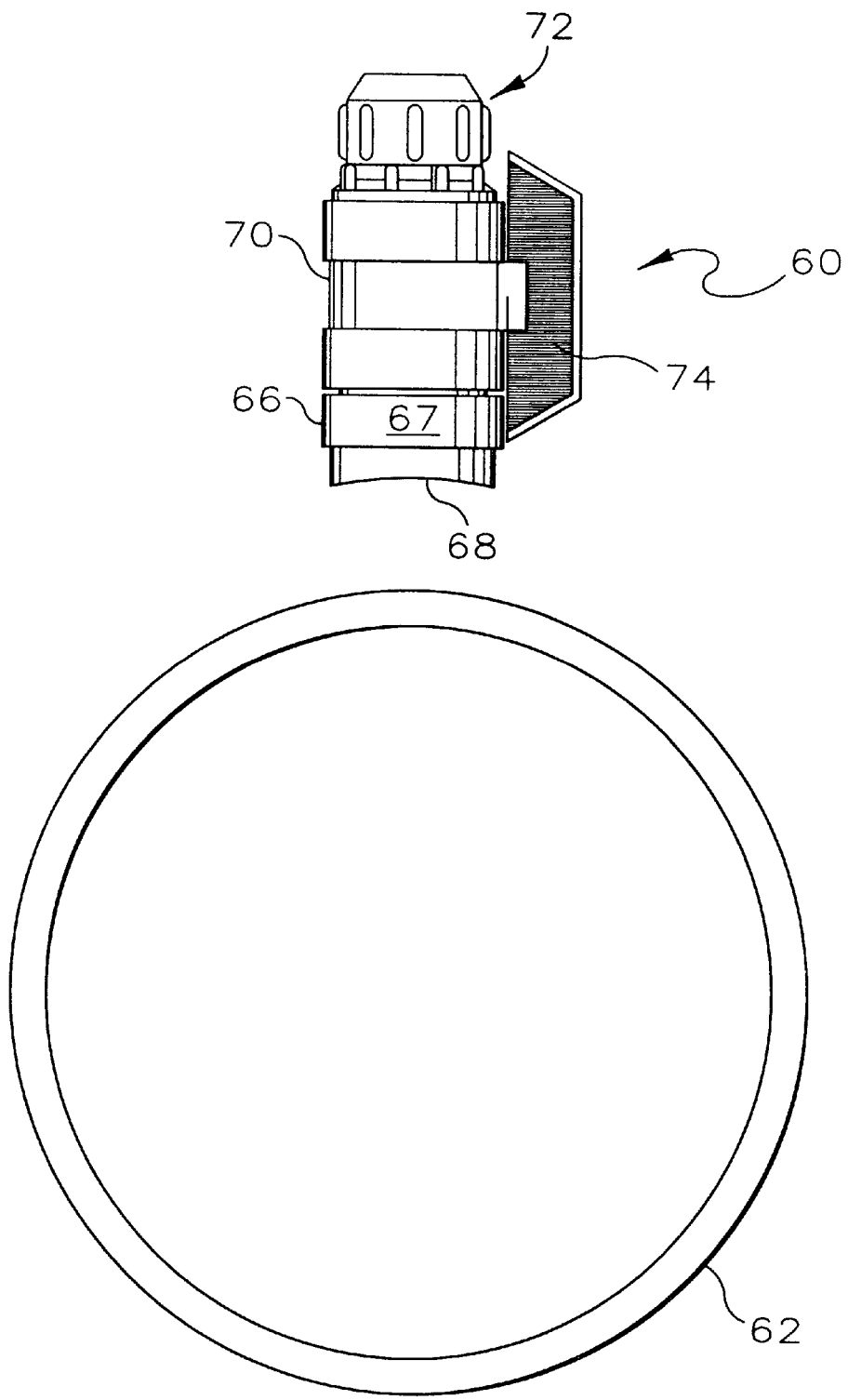
FIG. 2 is an elevation end view of a corporation stop assembly according to the present invention, positioned to be fusion welded to a larger diameter main pipe.

Referring now to FIG. 2, which shows the corporation stop assemble of this invention, generally shown at 60, positioned for connection to a main polyethylene pipe 62. The corporation stop assembly includes a stub length base 66, including an externally threaded valve outlet section 67, and a lower section 68. The base 66 is manufactured from a pipe grade resin material. Both the length of the base section and the grade of resin used in manufacturing the base 66 are important considerations in this invention. This is because selecting the pipe grade resin for the base 66 ensures compatible physical properties such as melt index and accordingly a compatible fusion when the base 66 is joined to the main pipe 62 made from the same resin. In selecting the length of the base 66 designated as A in FIG. 2, an important consideration is adapting the valve outlet to accept the clamp on the fusion machine. The length of the assembly will vary, however, depending on the diameter of the main pipe, and the particular fusion machine employed. Example dimensions include a length of the corporation stop assembly of about six inches, for use on a pipe having a diameter of about eight inches.

Still referring to FIG. 2, the lower end 68 of the base 66 is illustrated by a curved line having an appropriate radius to fit the outside diameter of the polyethylene main pipe 62. Accordingly, the lower end 68 of the base 66 can be machined for use with any diameter pipe, since the dimensions of the cross section of lower base 68 are uniform throughout.

Threadingly secured to the valve outlet section 67 of the base 66 is a corporation stop valve 70, which my be constructed of metal or an engineering plastic. As used herein, engineering plastics are reinforced plastics useful in engineering design for structural members. Examples of engineering plastics include, but are not limited to, glass reinforced thermoplastics such as: nylon, polycarbonate compounds, thermoplastic polyesters, polyphenylene sulfide compounds, polypropylene, etc. The presently preferred corporation stop valve 70 is a ball valve having a glass filled nylon body and a teflon filled polypropylene ball.

Also illustrated in FIG. 2 is a mechanical joint fitting generally illustrated at 72, that employs an O ring (not illustrated) for sealing a plastic or copper service pipe to the valve 70, and a handle 74 that will typically be color coded for its appropriate service. The valve fitting 72 includes an outlet connection that accepts standard service line sizes including ¾, 1, 1¼, 1½, and 2 inch lines. The fitting 72 can be used for a given nominal size that is either IPS or CTS, by selecting an appropriate insert.

Figure 5:
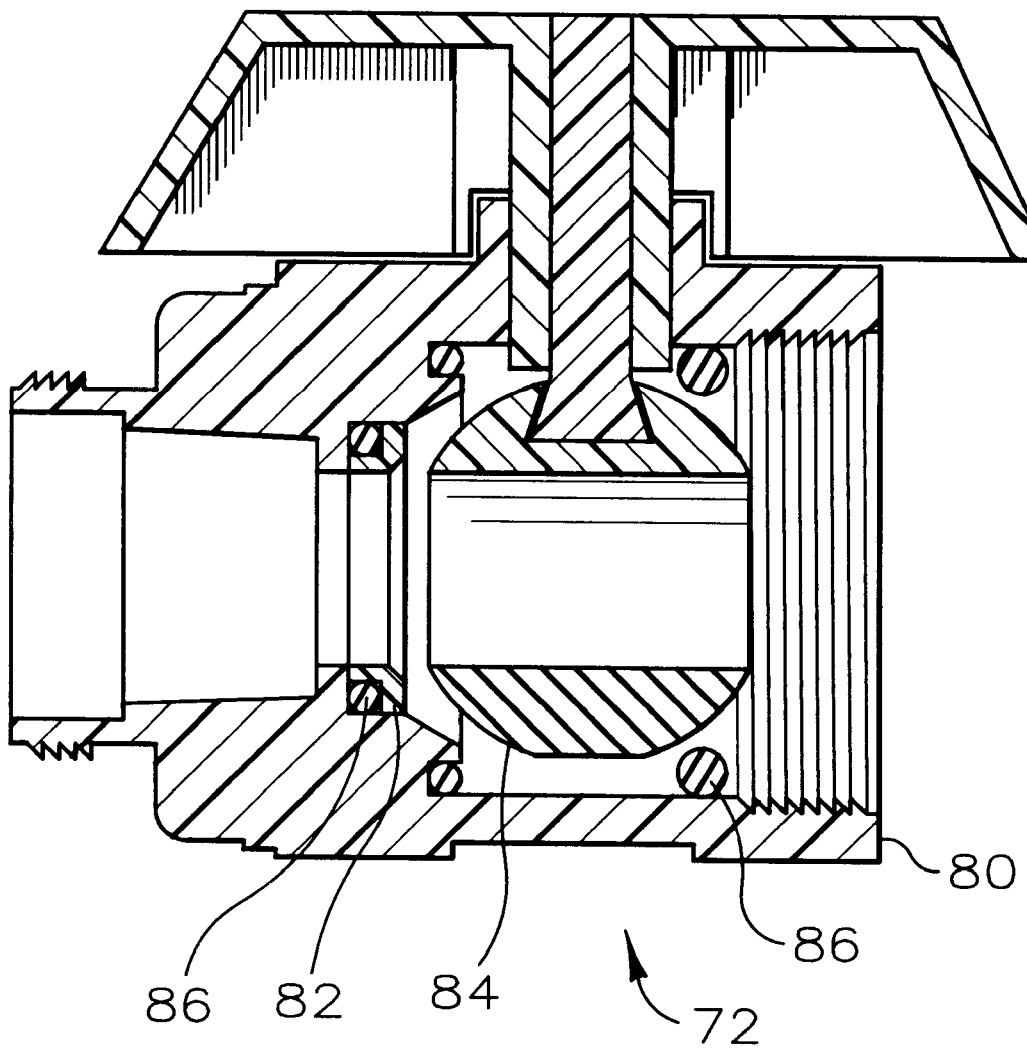
FIG. 5 is a longitudinally sectional view showing the material of construction of the preferred corporation stop valve.

Referring specifically now to FIG. 5, the material of construction of the preferred corporation stop valve are illustrated. The valve body, which is shown as reference numeral 80, and the valve seat 82 are constructed of glass filled nylon, and the valve ball 84 is constructed of teflon filled polypropylene. Also illustrated at 86 are O-Ring seals for the valve 72.

Figure 3:
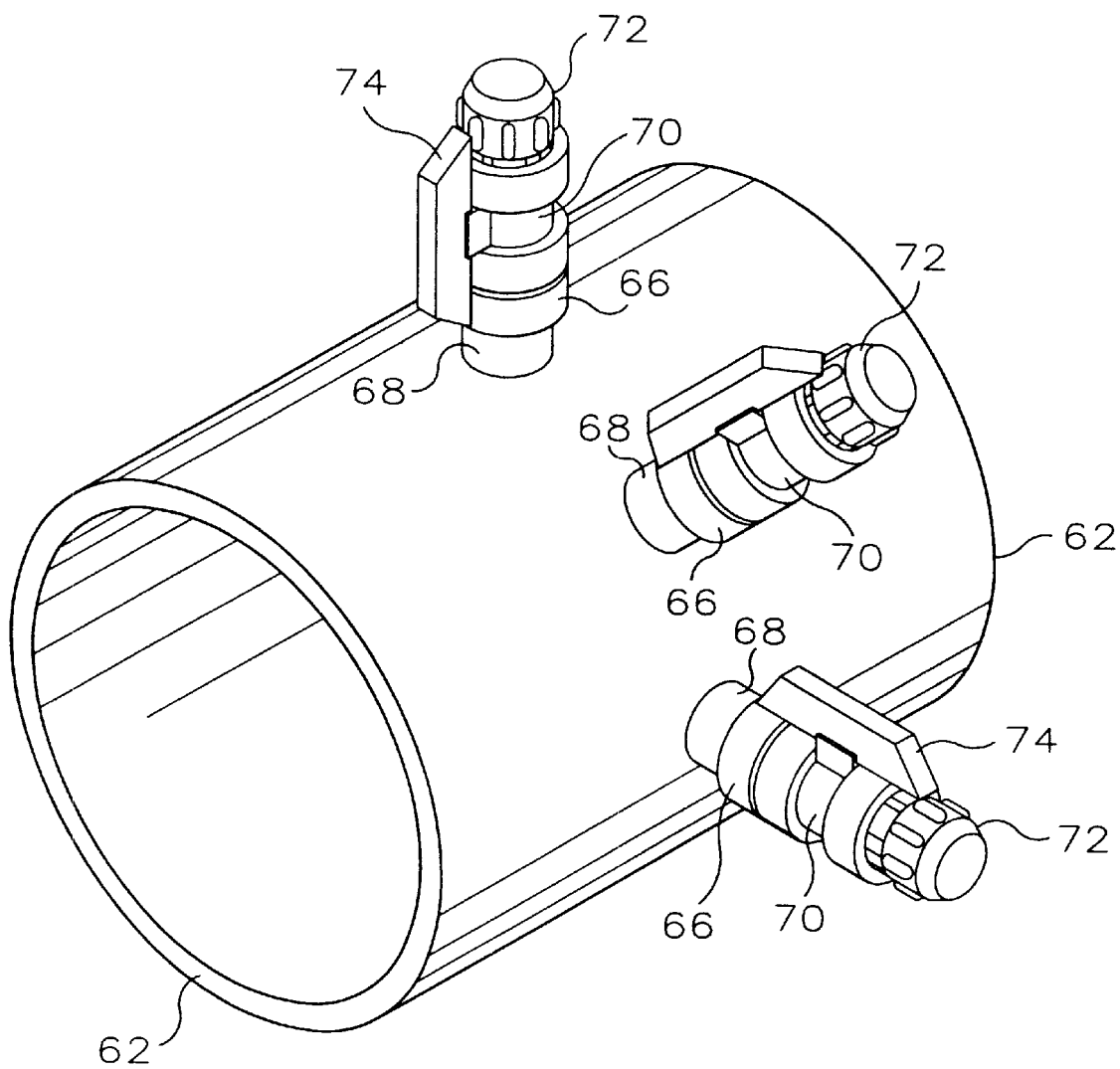
FIG. 3 is a perspective view showing three corporation stop assemblies of this invention fused to a main pipe at various angles from vertical.
Figure 4:
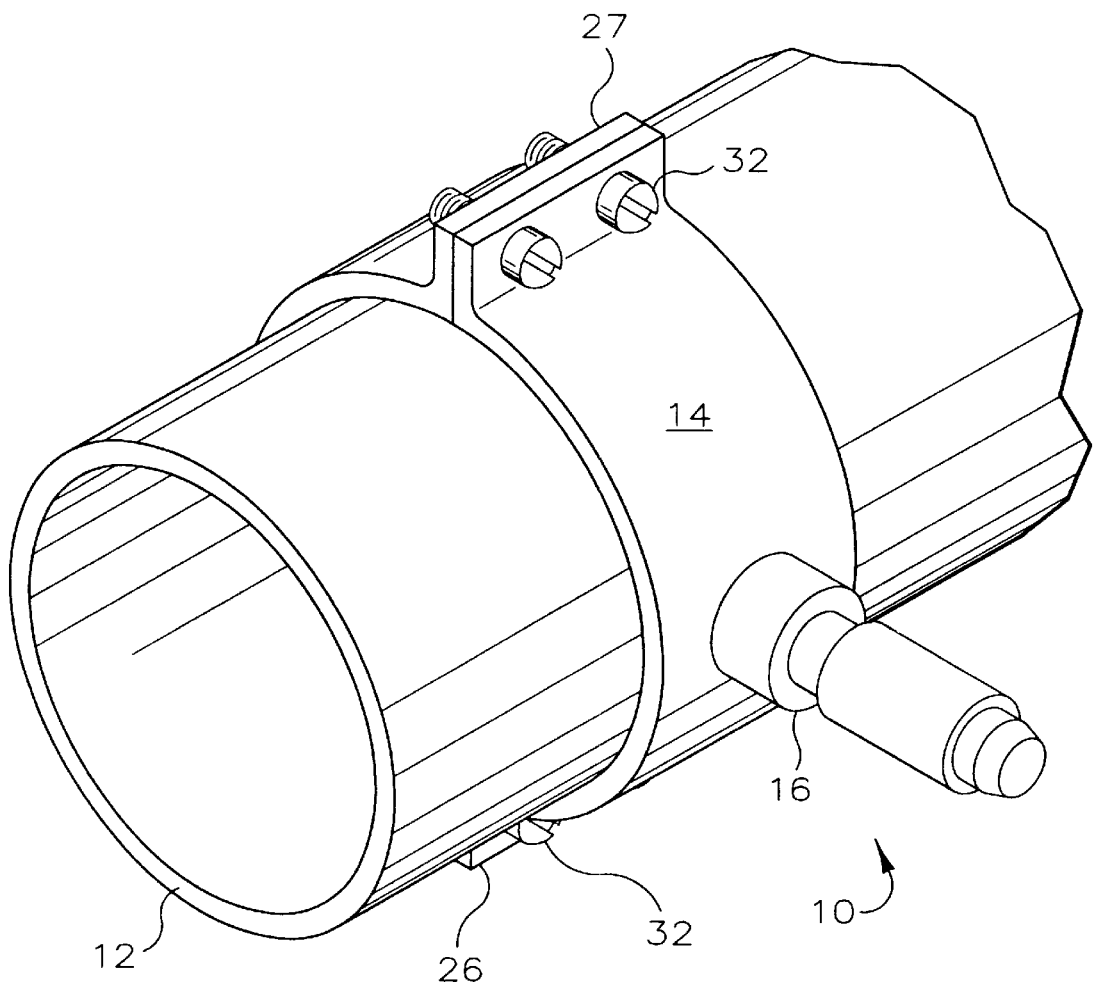
FIG. 4 is a perspective view showing a single service branch connected by a prior art service clamp.

Another feature of the present invention, which is using the corporation stop assembly for providing closely spaced branch pipes extending at various angles from the vertical, is illustrated in FIG. 3. In FIGS. 2 and 3 like reference numerals represent the same part. In FIG. 4, where like reference numerals represent the same part as in FIG. 1, a view of a single branch pipe using a prior art service clamp is illustrated for comparison with FIG. 3. This comparison emphasizes the convenience of this invention. This invention has been described with reference to a corporation stop assembly which can be used for efficient connection of branch pipe lines to main pipe lines. Selection of materials for the assembly should be compatible with the fluid being carried in the main pipe, and pressure or temperature ratings should also be compatible with the requirements of the main line. Reasonable modifications and alterations of this invention will become apparent to those skilled in the art from the foregoing discussion and accompanying drawings, and it should be understood that this invention is not to be unduly limited thereto.

That which is claimed:

1. An apparatus for connecting a customer service branch pipe to a main polyethylene fluid distribution pipe carrying a fluid under pressure, said apparatus comprising;
   a) at least one pipe fitting having a base section comprising a stub length of polyethylene pipe having a circular cross section at one end machined to essentially match the curvature of an outer surface of said main pipe, and positionable at any point along said outer surface, regardless of spacing and orientation of said main pipe, and having a valve outlet connection on the other end;
   b) a corporation stop valve constructed of engineering plastics, said corporation stop valve having an annular inlet end attached to said valve outlet connection of said base section, wherein the cross sectional area of said annular inlet end of said stop valve is substantially the same cross sectional area as said valve outlet connection of said base section;
   c) means for fusing said machined end of said base section to a generally circular fusion area at any location on said outer surface of said main pipe, wherein said generally circular fusion area on said outer surface of said main pipe at least matches the cross sectional area of said annular inlet of said corporation stop valve;
   d) a branch service pipe connected to an outlet end of said corporation stop valve wherein the cross sectional area of said branch service pipe substantially matches the cross sectional area of an outlet of said corporation stop valve; and
   e) means for hot tapping said main pipe through said corporation stop valve, wherein fluid communication is established through said corporation stop valve.

2. A pipe fitting in accordance with claim 1, wherein said corporate stop valve comprises a ball valve having a glass filled nylon body and a teflon filled polypropylene ball.

3. A pipe fitting in accordance with claim 1, wherein said main pipe is made of high density polyethylene and said base section is made of high density polyethylene having melt index properties substantially matching the melt index property of said main pipe.

4. Apparatus in accordance with claim 1, wherein said corporation stop valve is constructed of metal.

5. Apparatus in accordance with claim 1, wherein the length of said pipe fitting is about six inches and the diameter of said main distribution pipe is about eight inches.

6. A method for connecting a customer service branch pipe to a main polyethylene fluid distribution pipe carrying a fluid under pressure, said method comprising:
   a) providing at least one pipe fitting having a base section comprising a stub length of polyethylene pipe having a circular cross section at one end machined to essentially match the curvature of an outer surface of said main pipe, and positionable at any point along said outer surface, regardless of spacing and orientation of said main pipe, and having a valve outlet connection on the other end;
   b) providing a corporation stop valve constructed of engineering plastics, said corporation stop valve having an annular inlet end attached to said valve outlet connection of said base section, wherein the cross sectional area of said annular inlet end of said stop valve is substantially the same cross sectional area as said valve outlet connection of said base section;
   c) fusing said machined end of said base section to a generally circular fusion area at any location on said outer surface of said main pipe, wherein said generally circular fusion area on said outer surface of said main pipe at least matches the cross sectional area of said annular inlet of said corporation stop valve;
   d) connecting a branch service pipe to an outlet end of said corporation stop valve wherein the cross sectional area of said branch service pipe substantially matches the cross sectional area of said outlet of said corporation stop valve; and
   e) hot tapping said main pipe through said corporation stop valve, wherein fluid communication is established through said corporation stop valve.

7. A method in accordance with claim 6, wherein said distribution pipe is positioned essentially horizontally, and said step of fusing a base section to said distribution pipe additionally comprises:
   fusing said base section to the sidewall of said main pipe perpendicular to the longitudinal axis of said distribution pipe and at an angle of about 45 degrees from vertical.

8. A method in accordance with claim 6, wherein said corporation stop valve is a ball valve, said method additionally comprising:
   a) selecting glass filled nylon as a material of construction for the body of said corporation stop valve; and
   b) selecting teflon filled polypropylene as a material of construction for said ball contained in said corporation stop valve.

9. A method in accordance with claim 7, for connecting a plurality of corporation stop valves in close proximity on said main pipe, said method additionally comprising:
   fusing said plurality of corporation stop valves along a circumference of said main pipe.

10. A method in accordance with claim 7, wherein said step of fusing a base section to said main pipe comprises electrofusing said base section to said main pipe.

11. Apparatus in accordance with claim 1, said apparatus comprising:
   a plurality of said pipe fittings fused in close proximity and extending at various angles from said main pipe.

* * * * *